US011762809B2

(12) United States Patent
Barnum et al.

(10) Patent No.: US 11,762,809 B2
(45) Date of Patent: Sep. 19, 2023

(54) SCALABLE SUBSCRIPTIONS FOR VIRTUAL COLLABORATIVE WORKSPACES

(71) Applicant: Capital One Services, LLC, McLean, VA (US)

(72) Inventors: Eric K. Barnum, Midlothian, VA (US); Bhavik Gudka, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/555,718

(22) Filed: Dec. 20, 2021

(65) Prior Publication Data

US 2022/0114140 A1 Apr. 14, 2022

Related U.S. Application Data

(63) Continuation of application No. 16/886,848, filed on May 29, 2020, now Pat. No. 11,429,559, which is a continuation of application No. 16/597,473, filed on Oct. 9, 2019, now Pat. No. 10,686,645.

(51) Int. Cl.
*G06F 16/11* (2019.01)
*H04L 65/1083* (2022.01)

(52) U.S. Cl.
CPC ........ *G06F 16/128* (2019.01); *H04L 65/1083* (2013.01)

(58) Field of Classification Search
CPC ............. H04L 12/1813; H04L 65/1083; H04L 12/1822; G06F 16/128; G06Q 10/02; G06Q 10/101; G06Q 10/1093

USPC .......................................................... 709/204
See application file for complete search history.

(56) References Cited

U.S. PATENT DOCUMENTS

| 8,869,027 | B2 * | 10/2014 | Louch .................. G06F 3/0481 715/779 |
| 9,681,099 | B1 * | 6/2017 | Deets, Jr. ............... G06Q 10/10 |
| 9,939,994 | B2 * | 4/2018 | Ali ........................ G06F 3/0482 |
| 10,320,633 | B1 * | 6/2019 | Wong .................... H04L 67/535 |
| 10,693,758 | B2 * | 6/2020 | Puri ........................ H04L 43/16 |
| 10,764,121 | B2 * | 9/2020 | Derakhshan ........... H04L 45/42 |
| 10,816,954 | B2 | 10/2020 | Mita et al. |
| 10,862,777 | B2 * | 12/2020 | Richards ............... H04L 43/045 |

(Continued)

FOREIGN PATENT DOCUMENTS

SE 1750076 A1 * 8/2018

*Primary Examiner* — Melvin H Pollack
(74) *Attorney, Agent, or Firm* — KDW Firm PLLC

(57) ABSTRACT

Systems, methods, articles of manufacture, and computer program products for scalable subscriptions for virtual collaborative workspaces. An indication of a process event associated with a computer-implemented process may be received. A population of subscribers subscribed to at least one property of one of the process event or the computer-implemented process may be determined. A virtual collaborative workspace for the process event may be generated, the virtual collaborative workspace operative to present context information associated with the process event to a plurality of subscribers. A message may be sent to the population of subscribers indicating the process event, the message comprising a link to access the virtual collaborative workspace. The virtual collaborative workspace may be generated for display responsive to selection of the link by the at least one of the population of subscribers.

20 Claims, 9 Drawing Sheets

(56) References Cited

U.S. PATENT DOCUMENTS

| | | | |
|---|---|---|---|
| 10,911,263 B2* | 2/2021 | Richards | H04L 12/4641 |
| 11,226,919 B1* | 1/2022 | Austin | G06F 13/4221 |
| 11,232,117 B2* | 1/2022 | Mulder | G06F 16/24578 |
| 11,297,024 B1* | 4/2022 | Madan | H04L 51/18 |
| 11,314,768 B2* | 4/2022 | Grewal | G06F 40/20 |
| 2014/0373031 A1 | 12/2014 | Ide et al. | |
| 2015/0281322 A1* | 10/2015 | Dingwell | G06F 21/00 |
| | | | 715/740 |
| 2016/0055026 A1* | 2/2016 | Fitzgerald | H04L 63/1433 |
| | | | 718/1 |
| 2016/0162172 A1* | 6/2016 | Rathod | G06F 9/451 |
| | | | 715/747 |
| 2017/0010771 A1* | 1/2017 | Bernstein | G09G 5/12 |
| 2017/0075719 A1* | 3/2017 | Scallan | G06F 11/203 |
| 2017/0140387 A1* | 5/2017 | Nandi | G06Q 30/016 |
| 2017/0178034 A1* | 6/2017 | Skeen | H04N 21/4825 |
| 2017/0223046 A1* | 8/2017 | Singh | H04L 63/1491 |
| 2017/0366496 A1* | 12/2017 | Habermehl | G06Q 30/0201 |
| 2018/0139086 A1* | 5/2018 | Chakraborty | H04L 43/028 |
| 2018/0365628 A1* | 12/2018 | Bhaskaran | G06Q 10/063112 |
| 2019/0089701 A1* | 3/2019 | Mercury | H04W 4/38 |
| 2019/0097909 A1* | 3/2019 | Puri | H04L 43/08 |
| 2019/0190942 A1* | 6/2019 | Drummond | H04L 43/16 |
| 2019/0265865 A1* | 8/2019 | Yaseen | G06Q 30/016 |
| 2020/0160458 A1* | 5/2020 | Bodin | G06F 8/33 |
| 2020/0167699 A1* | 5/2020 | Cohen | H04L 51/52 |
| 2021/0029142 A1* | 1/2021 | Rajasekaran | G06F 9/542 |
| 2021/0176261 A1* | 6/2021 | Yavo | G06N 20/00 |
| 2021/0406041 A1* | 12/2021 | Saraiya | G06F 16/9017 |
| 2022/0210168 A1* | 6/2022 | Yavo | H04L 63/1433 |

* cited by examiner

700

```
Generate Candidate List Comprising Subscribers In Subscriber Database
Subscribing To Severity Level Of Process Event
702
            │
            ▼
Update Candidate List Based On Subscribers In Database Subscribing To Line Of
Business Impacted By Process Event
704
            │
            ▼
Update Candidate List Based On Subscribers In Database Subscribing To
Applications Impacted By Process Event
706
            │
            ▼
Receive Contact Preferences/information For Each Subscriber In Candidate List
708
```

*FIG. 7*

SCALABLE SUBSCRIPTIONS FOR VIRTUAL COLLABORATIVE WORKSPACES

RELATED APPLICATIONS

This application is a continuation of U.S. patent application Ser. No. 16/866,848, filed on May 5, 2020, which is a continuation of U.S. patent application Ser. No. 16/597,473 (now U.S. Pat. No. 10,686,645), filed on Oct. 9, 2019. The contents of the aforementioned applications are incorporated herein by reference in their entirety.

TECHNICAL FIELD

Embodiments herein generally relate to computing platforms, and more specifically, to scalable subscriptions for virtual collaborative workspaces.

BACKGROUND

Computing systems may experience operational errors or other types of events. Therefore, information describing the operational status of the system may be monitored. The complexity of managing such information increases as the number of systems in a given environment increases. Furthermore, organizational environments are more complicated than simple flat structures in which each entity is represented as a node. In such flat structures, every node is active and requires other nodes to subscribe to the node to receive information from the node. Replicating such a structure within organizational environments having tens of thousands (or more) of entities would require hundreds of millions of nodes to facilitate subscriptions between the entities in the organizational environment. This is not manageable for any organization, even organizations with more modest numbers of entities.

SUMMARY

Embodiments disclosed herein provide systems, methods, articles of manufacture, and computer-readable media for scalable subscriptions for virtual collaborative workspaces. In one example, an indication of a process event associated with a computer-implemented process may be received. A population of subscribers subscribed to at least one property of one of the process event or the computer-implemented process may be determined. A virtual collaborative workspace for the process event may be generated, the virtual collaborative workspace operative to present context information associated with the process event to a plurality of subscribers. A message may be sent to the population of subscribers indicating the process event, the message comprising a link to access the virtual collaborative workspace. The virtual collaborative workspace may be generated for display responsive to selection of the link by the at least one of the population of subscribers.

BRIEF DESCRIPTION OF THE DRAWINGS

FIG. 7 illustrates an embodiment of a second logic flow.

DETAILED DESCRIPTION

Figure 1:
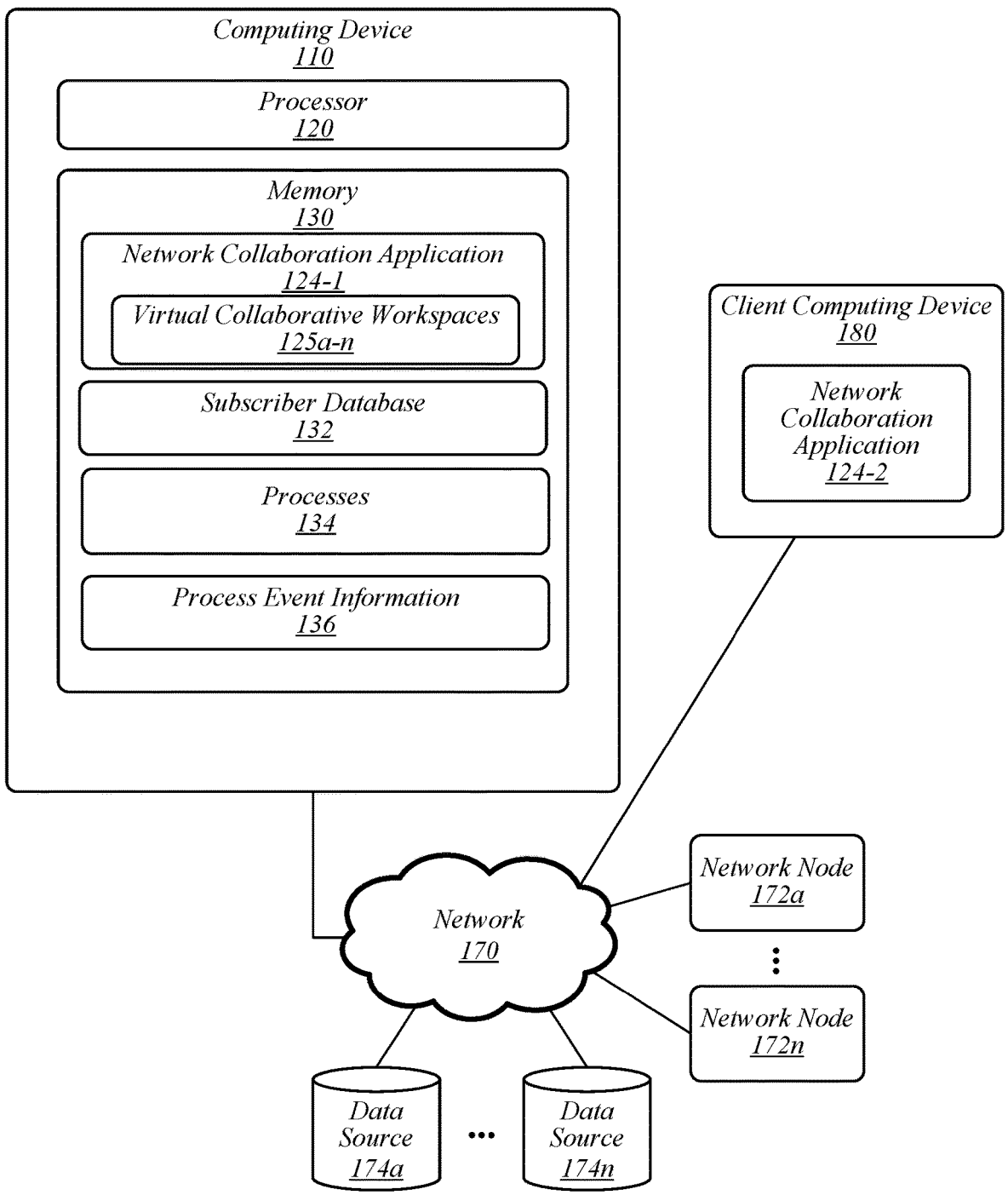
FIG. 1 illustrates an embodiment of a system that provides scalable subscriptions for virtual collaborative workspaces.

Embodiments disclosed herein provide dynamic, scalable subscriptions for virtual collaborative workspaces. Generally, a virtual collaborative workspace may automatically be launched responsive to a detected process event, where the process event is any computing-related event such as an application failure. The virtual collaborative workspace may be launched to include the historical context and a current state of the application, system, and/or any components thereof. Doing so allows different collaborators to allow the process event to be corrected, e.g., by correcting the application failure in light of the historical context and/or current state.

To alert users of the process event and/or generation of the virtual collaborative workspace, embodiments disclosed herein provide a dynamic, scalable subscription service library. The service library may generally allow users to specify any number and type of criteria for subscribing to process events. For example, users may subscribe to process events by application, severity of process events (e.g., complete outage vs. slow performance), and any other attribute of interest. According to embodiments disclosed herein, specialized databases are provided to reduce each subscription mode of user data into an event flag. Furthermore, the specialized datasets may reduce the service library modes into an event mode. As the service library processes a process event (e.g., a service outage), an exact match between subscription modes to event modes is used to generate a communications package containing relevant information. This communications package may comprise one or more messages that are sent to a user along with a link to the virtual collaborative workspace for the process event. The messages may be sent one or more user-specified communications channels, such as email, text messages, website feeds, really simple syndication (RSS) feeds, social media messages, and the like.

Advantageously, embodiments disclosed herein provide techniques notify users of process events for which a virtual collaborative workspace is dynamically generated. Furthermore, embodiments disclosed herein advantageously operate across hundreds of thousands (or more) of users, internal groups, and/or external groups, and remains highly resilient. In contrast to conventional solutions which cannot scale due to complexity, embodiments disclosed herein can scale to accommodate subscriptions and reporting for any number of users in any type of organization. Doing so allows any level of user and any type of user to subscribe to process events based on one or more of: application, severity of the process event, impacted line of business, impacted systems, or any other attribute of interest.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result.

These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1 is a schematic of an exemplary system 100 that provides scalable subscriptions for virtual collaborative workspaces, consistent with disclosed embodiments. As shown, the system 100 includes one or more computing devices 110, one or more network nodes 172, one or more data sources 174, and one or more client computing devices 180 communicably coupled via a network 170. The computing devices 110, network nodes 172, data sources 174, and/or client devices 180 are representative of any type of computing device, such as a server, desktop computer, laptop computer, smartphone, virtualized computing system, compute cluster, portable gaming device, and the like.

As shown, the computing device 110 includes at least a processor 120 and a memory 130. The network nodes 172, data sources 174, and/or client devices 180 may similarly include a processor and memory (not depicted for the sake of clarity). Furthermore, the computing devices 110, network nodes 172a-172n (where "a" and "n" are positive integers herein), data sources 174a-n, and/or client devices 180 may include additional elements not depicted for the sake of clarity. The memory 130 includes a network collaboration application 124-1, a subscriber database 132, one or more executing processes 134, and a data store of process event information 136. The client device 180 includes an instance 124-2 of the network collaboration application.

The network collaboration application 124 (which includes instances 124-1 and 124-2) is configured to provide virtual collaborative workspaces 125a-n in the system 100. Generally, the network collaboration application 124-1 is configured to launch a virtual collaborative workspace 125 that is accessible via the network collaboration application 124-2 of one or more client devices 180. In some embodiments, the virtual collaborative workspaces 125 are accessible by a different application, such as a web browser, via the client devices 180.

The network collaboration application 124-1 may generate a virtual collaborative workspace 125 responsive to a process event. As used herein, a process event is any event related to the operation of a system, application, process data, or any other computing entity (e.g., network links, etc.). For example, the process event may be that data in data source 174a is currently not accessible. As another example, the process event may be that an instance of an application hosted on network node 172n is not responsive. As another example, the process event may be that one of the processes 134 has crashed. In other examples, the process event may be a fix to an application and/or process executing in the system 100. More generally, the process event may be any type of break event, corrective action, error, unavailability, performance issue, or other event associated with any hardware and/or software entity in the system 100.

The network collaboration application 124-1 may generate the virtual collaborative workspace 125 based on collected process event information 136. The process event information 136 may include data describing a historical context and a current state of the systems, applications, hardware, software, and/or components thereof associated with the process event. The historical context may include data related to one or more events in an event chain that led to the process event, resource use during the event chain, the types of events in the event chain, and the like. For example, the historical context may include a first application failing prior to a second application failing. The current state may include hardware states, software states, source code, debugging information, log files, web analytics data, trace data, and the like. In some embodiments, the current states are part of the historical context.

Generally, once launched, the virtual collaborative workspace 125 brings the historical context and current system state to the forefront for all users, thereby allowing the users to collaboratively identify a solution to fix the process event and restore all affected components to a normal operational state. For example, by outputting source code associated with a process event, the users may fix the source code to resolve the process event caused by the source code. In some embodiments, the network collaboration application 124-1 generates a title for the process event, a severity level of the process event, an impacted line of business for the process event, and impacted entities (e.g., applications and/or computing systems) impacted by the process event. These generated elements may then be outputted for display via the client device 180.

Generally, one or more users may subscribe to process events, which may be stored in the subscriber database 132. The subscriber database 132 may generally include data describing a plurality of entities (e.g., users, groups of users, etc.) subscribed to a given process event. The subscriptions in the subscriber database 132 may be based on any property (or attribute). For example, subscriptions may be made to computing systems (physical and/or virtualized), processes (or applications), to process event types (e.g., to critical errors, systemwide errors, localized errors, etc.), process types (e.g., finance applications, a group of related applications, etc.), a type of affected hardware entity (e.g., an affected network interface, overloaded processor, etc.), a type of software entity (e.g., an affected process, operating system, etc.), or any other property. Further still, the user may specify a desired communications format (e.g., email, social media messaging, text message, etc.) for receiving notifications regarding process events and the associated virtual collaborative workspaces 125a-n generated by the network collaboration application 124-1.

The network collaboration application 124-1 may therefore reference the subscriber database 132 to determine a population of subscribers subscribed to at least one property of the process event. As stated, the network collaboration application 124-1 may determine the severity of the process event (e.g., an integer of a range of values), an impacted line of business, and a list of affected systems and/or applications as part of the process information 136. For example, the process event information 136 generated by the network collaboration application 124-1 may specify that a page fault error for a web server has a severity of 5 on a scale from 1 to 5, that information technology (IT) is the impacted line of business, and that the web server (and any other applications that use the web server) is the impacted application. In such an example, the network collaboration application 124-1 may select the subscribers from the subscriber database 132 that subscribe to process events that have a severity value equal to 5, that impact the IT line of business, and that impact the web server. However, in other embodiments, the network collaboration application 124-1 may determine the population of subscribers according to each individual property, or greater than one but fewer than all properties collectively. For example, an IT director may subscribe to email alerts for all process events that impact the IT line of business regardless of severity. As another example, the IT director may subscribe to all SMS alerts for all process events that impact the web server. As yet another example, a public relations manager may subscribe to the most severe process events (e.g., all process events having a severity value equal to 5).

In some embodiments, subscribers may subscribe to receive notifications for process events that impact entities that are related to other entities (e.g., subscribe to all process events that impact systems connected to system X). Similarly, subscribers may subscribe to receive notifications for related process events. For example, a user may subscribe to notifications when application X is spiking while another application Y has failed.

Once the population of subscribers is identified, the network collaboration application 124-1 may determine communication information in the subscriber database 132 for each subscriber. The communication information may include any type of communication information, such as preferred methods of receiving communications, contact information, email addresses, phone numbers, social media contact information, push notification identifiers, and the like. The network collaboration application 124-1 may then transmit a message to each identified subscriber according to the determined communication information, e.g., via email, text (or short message service (SMS)) messages, social media messages, fax, push notification, etc. In some embodiments, the users may specify more than one preferred communication (e.g., email and text message).

The message sent by the network collaboration application 124-1 may include a uniform resource identifier (URI) to the virtual collaborative workspace 125. When selected by a user of the network collaboration application 124-2 of the client device 180, the user may view the virtual collaborative workspace 125 which includes at least the process event information 136. The users may then communicate via the virtual collaborative workspace 125 (e.g. via text, voice, etc.) to identify a fix for the process event. For example, the users may determine to allocate more memory to the web server. The network collaboration application 124-1 may then transmit a message including the fix to all subscribers subscribed to the process event, e.g., based on the subscriber database 132 and the process event information 136.

The network collaboration application 124-1 may generally determine populations of subscribers any number of times for any type of process event. For example, if a process event receives an increased severity level (relative to an initial severity level) over time, the network collaboration application 124-1 may determine an updated population of subscribers based on the increased security level. The network collaboration application 124-1 may then transmit messages for the corresponding virtual collaborative workspace 125 to the updated population of subscribers.

Figure 2:
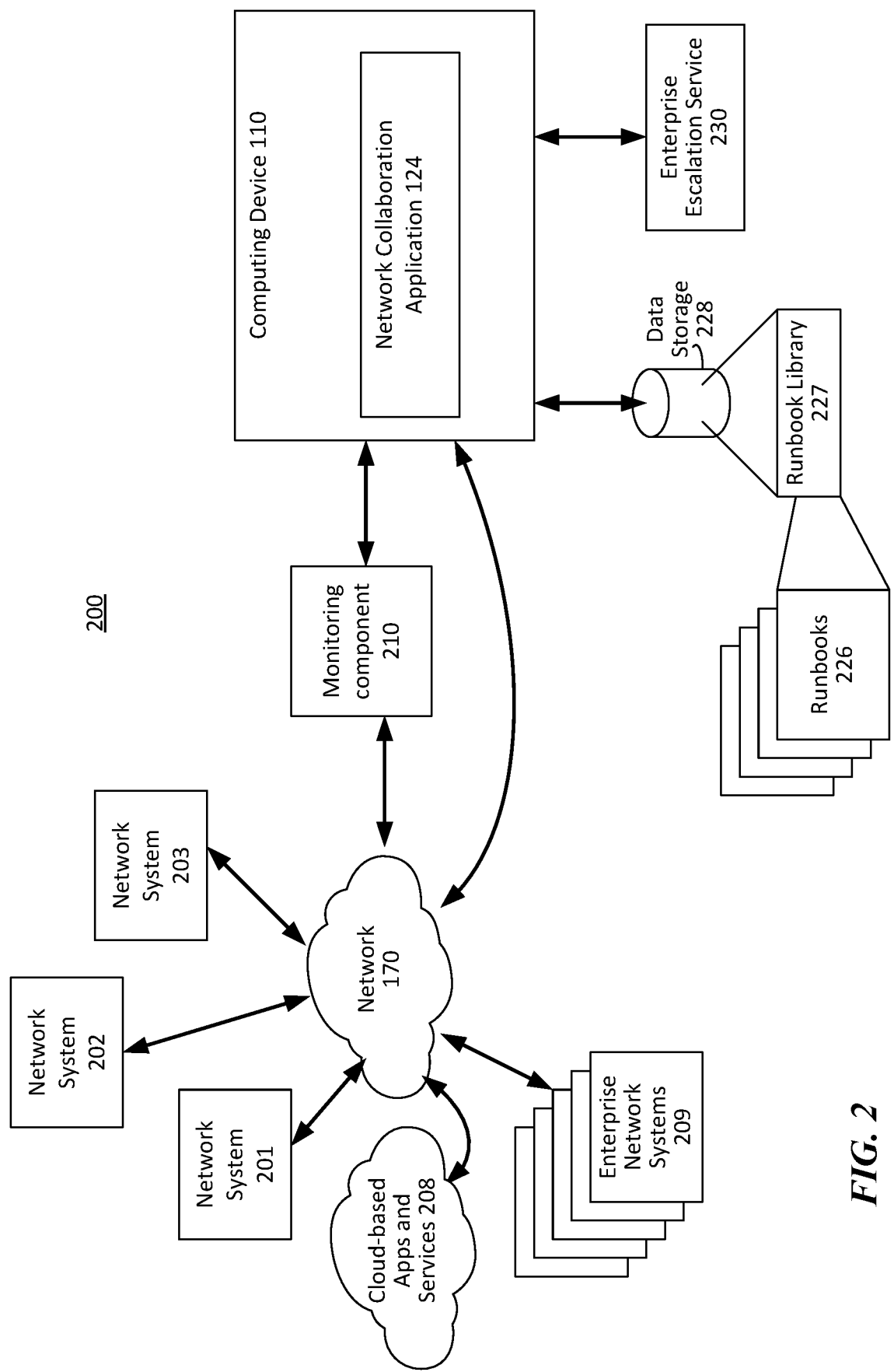
FIG. 2 illustrates an embodiment of a system that provides for virtual collaborative workspaces.

FIG. 2 illustrates an embodiment of a system 200 that provides scalable subscriptions for virtual collaborative workspaces. As shown, the system 200 includes the computing device 110, network systems 201-203, the network 170 (which may be an enterprise network), a plurality of cloud-based applications and services 208, a plurality of enterprise network systems 209, and a monitoring component 210. The monitoring component 210 (which may be a component of the network collaboration application 124) generally monitors the state of all entities in the system 200 to identify process events and/or corrective actions to fix process events. For example, the monitoring component 210 may determine that a cloud-based service 208 is experiencing a process event due to non-responsiveness. The monitoring component 210 may then provide an indication of the process event to the network collaboration application 124-1.

The network collaboration application 124-1 may then determine whether a runbook 226 for the process event exists in a runbook library 227 stored in the data storage 228. Generally, a runbook 226 may include one or more operations to resolve a process event. If a runbook 226 is present, then the network collaboration application 124-1 may cause the runbook 226 to be executed to resolve the process event. In some embodiments, the runbook 226 may be matched to a process event based on a correlation score computed for the process event. The correlation score may reflect a similarity between the process event and one or more historic process events associated with the runbook 226. If the correlation score exceeds the threshold, the runbook 226 is matched to the process event and used to resolve the process event. If no runbook 226 exists, or the correlation score is below the threshold for all runbooks 226, the process event cannot be programmatically resolved, and the network collaboration application 124-1 generates a virtual collaborative workspace 125 for the process event. The network collaboration application 124-1 may then identify the population of subscribers from the subscriber database 132, and transmit a message including a link to the virtual collaborative workspace 125 to each subscriber. In some embodiments, the process event may be escalated to additional subscribers via the enterprise escalation service 230.

In some embodiments, the network collaboration application 124-1 and/or the runbook 226 may compute a risk score for the process event. In such embodiments, if the risk score exceeds a threshold, the network collaboration application 124-1 may generate the virtual collaborative workspace 125 for the process event. Otherwise, if the risk score does not exceed the threshold, the network collaboration application 124-1 may refrain from the virtual collaborative workspace 125 for the process event and refrain from generating notifications for the process event.

Figure 3:
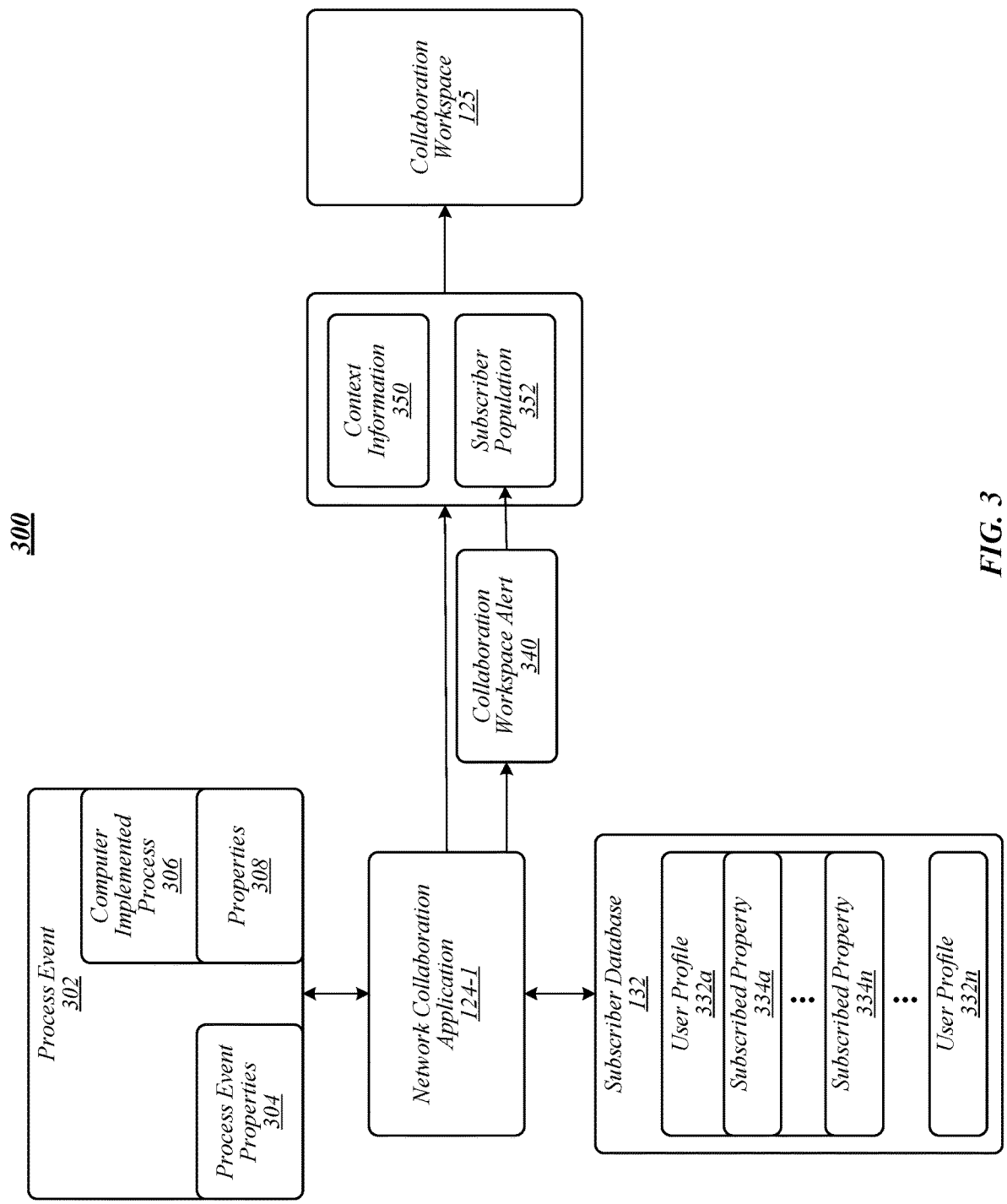
FIG. 3 illustrates an embodiment of scalable subscriptions for virtual collaborative workspaces.

FIG. 3 is a schematic 300 illustrating an embodiment of scalable subscriptions for virtual collaborative workspaces. As shown, the network collaboration application 124-1 may receive a process event 302. The process event 302 may be generated by the network collaboration application 124-1. The process event 302 may include data describing one or more process event properties 304 (e.g., process event information 134), one or more computer-implemented processes 306 (e.g., a process 134, an application, etc.) impacted by the process event 302, and one or more properties 308 of the computer-implemented process 306 (e.g., application type, operations performed by the process 306, etc.). For example, the process event properties 304 may specify that the process event has a severity level of 4 out of 5, affects the accounting line of business, and impacts an accounting application (e.g., the process 306). The properties 308 may include additional detail regarding the accounting application, such as the operations performed, the current state of the application, the context of the accounting application and any associated hardware resources used by the accounting application, a type of the application, a priority of the application, the state of any associated hardware resources used by the application, and the like.

The network collaboration application 124-1 may reference the subscriber database 132 to determine a population of subscribers to the process event 302. As shown, the subscriber database 132 includes a plurality of user profiles 332a-332n. The user profiles 332 may specify one or more subscribed properties 334a-334n. For example, property 334a may specify to subscribe to all IT-related events that have a severity level greater than or equal to 3 out of 5. As another example, property 334n may specify to subscribe to all IT-related events regardless of severity level. As stated, the user profiles 332 may include information related to preferred methods of delivery for messages generated by the network collaboration application 124-1. The delivery methods may be specific to one, more than one, or all subscribed properties 334a-334n.

Therefore, the network collaboration application 124-1 may determine a subscriber population 352 from the subscriber database 132 for the process event 302. The network collaboration application 124-1 may then generate a collaboration workspace alert 340 that is sent to the subscriber population 352. The alert 340 may be sent according to the preferences specified in the user profiles 332a-n. For example, email, social media, and/or text message alerts 340 may be sent. The alert 340 may further include the context information 350 for the process event 302. The network collaboration application 124-1 may generate the context information 350 based on the process event 302, e.g., the event properties 304 and/or the process properties 308. The alert 340 may further include a link to a virtual collaborative workspace 125. When selected, the user may access a GUI for the virtual collaborative workspace 125.

Figure 4:
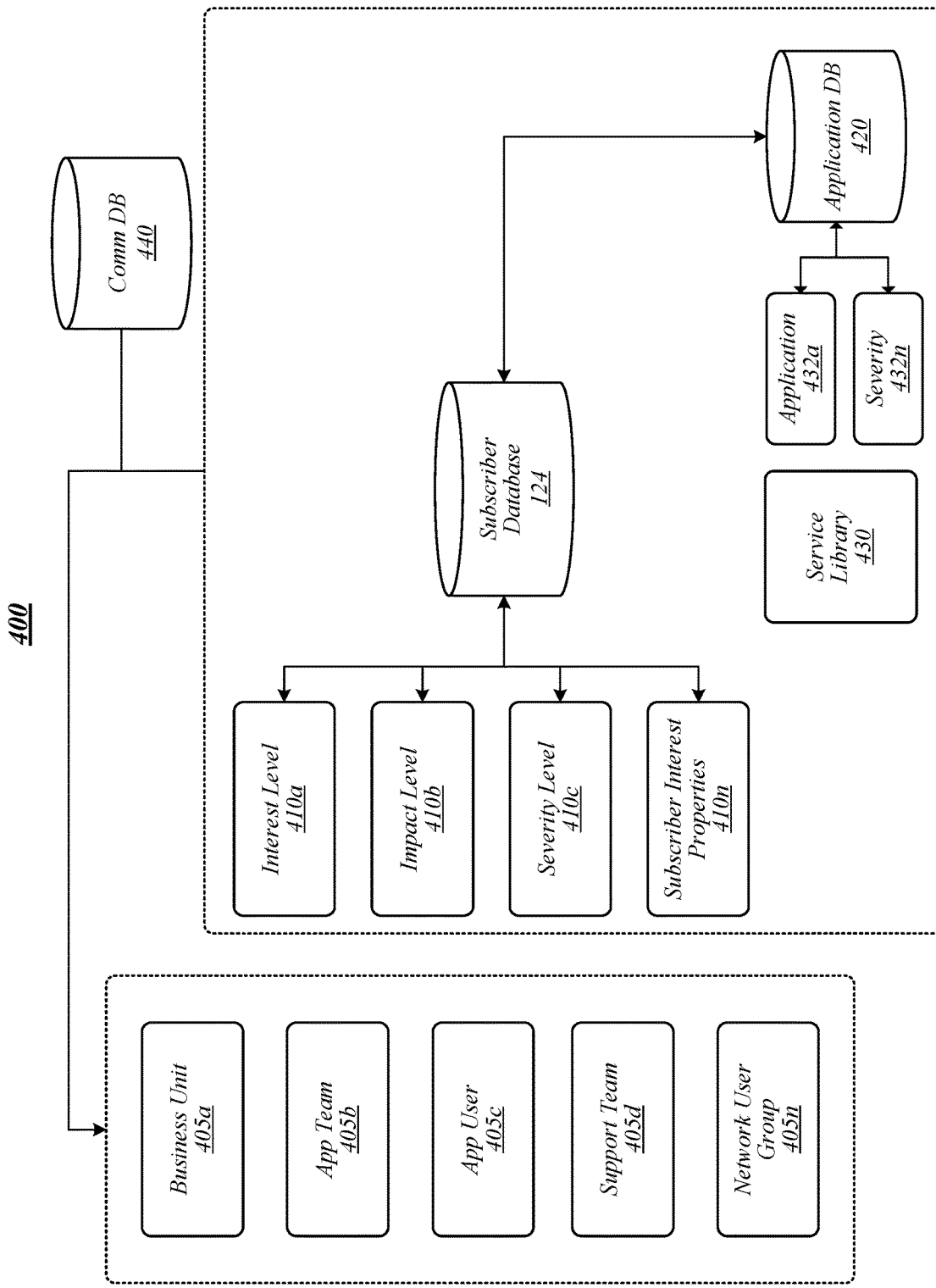
FIG. 4 illustrates an embodiment of scalable subscriptions for virtual collaborative workspaces.

FIG. 4 is a schematic 400 illustrating an embodiment of scalable subscriptions for virtual collaborative workspaces. As shown, the subscriber database 132 may specify different user profile properties, such as an interest level 410a, impact level 410b, severity level 410c, and other subscriber interest properties 410n. The interest level 410a may specify a level of interest the associated user (or user group) has in a specific computing entity and/or process event (e.g., low, medium, or high interest). The impact level 410b may specify a level of impact the user has in a computing entity and/or process event (e.g., an impact on one system, all systems, a subset of systems, all applications, one application, a subset of applications, etc.). The severity level 410c may correspond to a process event incident severity level described above (e.g., a severity level on a scale from 1-5). The other subscriber interest properties 410n correspond to other user-specified preferences. For example, users may subscribe at the application level, system level, event type level, etc. Once specified by a user, the interest level 410a, impact level 410b, severity level 401c, and other subscriber interest properties 410n may be stored in the subscriber database 132 in a subscription mode. Doing so allows the users to receive process event notifications associated with applications and/or systems in the application database 420 in an event mode. Advantageously, doing so allows only those users (or groups) to receive notifications for subscribed process events, while refraining from sending notifications to users who have not subscribed to the process event.

The application database 420 may generally store data describing a plurality of different applications and/or systems. The application database 420 may further store a current context of each application and event histories of each application. A service library 430 may correspond to one or more libraries provided by the network collaboration application 124-1. The service library 430 may generally perform the operations described herein with reference to the network collaboration application 124-1. For example, the service library 430 may detect a process event with an application 432a having an entry in the application database 420. The service library 430 may notify the network collaboration application 124-1 to generate an incident bridge for the process event. As shown, the service library 430 may further define an incident severity 432n to the process event (e.g., a value on a range from 1 to 5). However, as stated, the service library 430 may define other properties of the process event, such as a title, one or more impacted lines of business, and one or more impacted applications (or systems).

A communications database 440 may be an enterprise database for storing data describing entities in an enterprise. Illustratively, the database 440 may include data describing different business units 405a, application teams 405b, application users 405c, support teams 405d, and/or network user groups 405n, each of which may be registered for subscriptions in the subscriber database 132. For example, a business unit 405a may include one or more business units, such as finance, accounting, IT, legal, etc. Each business unit 405a may have one or more associated users. Members of the business unit 405a may subscribe to receive notifications for process events that impact their business unit in the subscriber database 132. The application teams 405b may comprise one or more users assigned to an application. Members of the application teams 405b may be subscribed to receive notifications for the associated applications in the subscriber database 132.

The application users 405c may correspond to one or more users associated with an application. Members of the application users 405c may be subscribed to receive notifications for the associated applications in the subscriber database 132. The support teams 405d may comprise one or more users assigned to a support team for an application and/or system. Members of the support teams 405d may be subscribed to receive notifications for the associated applications and/or systems in the subscriber database 132. The network user groups 405n may comprise one or more users assigned to a network group. Members of the network user groups 405n may be subscribed to receive notifications for the associated network groups in the subscriber database 132.

Figure 5A:
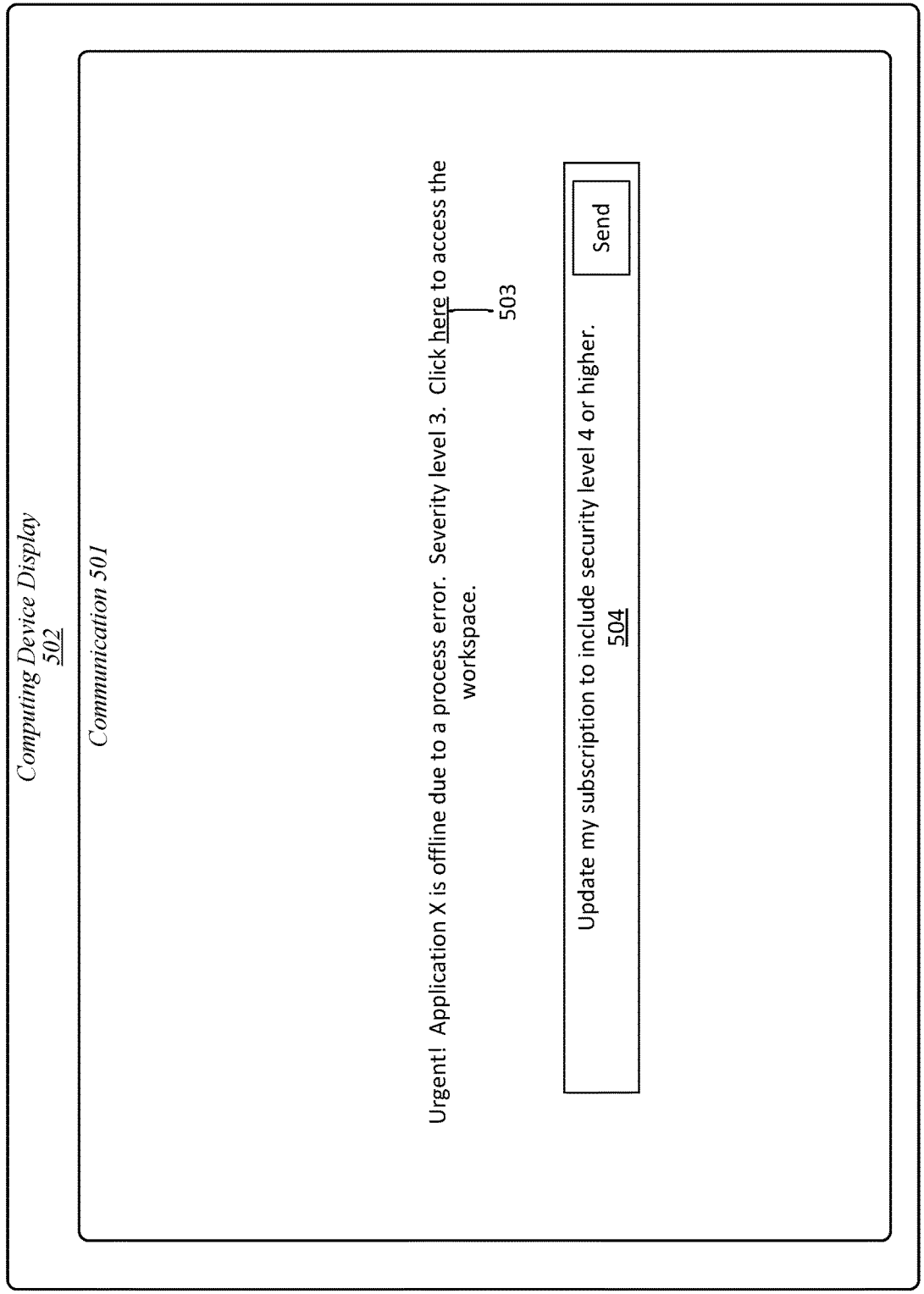
FIGS. 5A-5B illustrate embodiments of a virtual collaborative workspace.

FIG. 5A illustrates an embodiment of a communication 501 sent by the network collaboration application 124-1 to one or more subscribers. As shown, a computing device display 502 (e.g. of a client device 180) may output the communication 501. The communication 501 includes a link 503 to the virtual collaborative workspace 125 for a process error. The user may respond to the communication via a communications interface 504. Doing so provides two-way communication, such that the user may respond to any communication sent by the network collaboration application 124-1. For example, the user may reply to a text message or an email message serving as the communication 501. In some embodiments, the response may be posted to the virtual collaborative workspace 125 (e.g., "User x says: I'm joining now".

In the depicted embodiment, the communication sent via the interface 504 may be used to update the user's subscription. For example, as shown, the process event corresponding to the communication 501 has a severity level of 3. However, the user may wish to modify the subscription to not receive notifications for process events having severity levels of 3. Therefore, as shown, the user provides input specifying to modify the subscription to include process errors having severity levels of 4 or greater. The message sent via the interface 504 may be received by the network collaboration application 124-1, which may analyze the message and modify the corresponding subscription in the subscriber database 132 to reflect the requested change to the severity level.

Figure 5B:
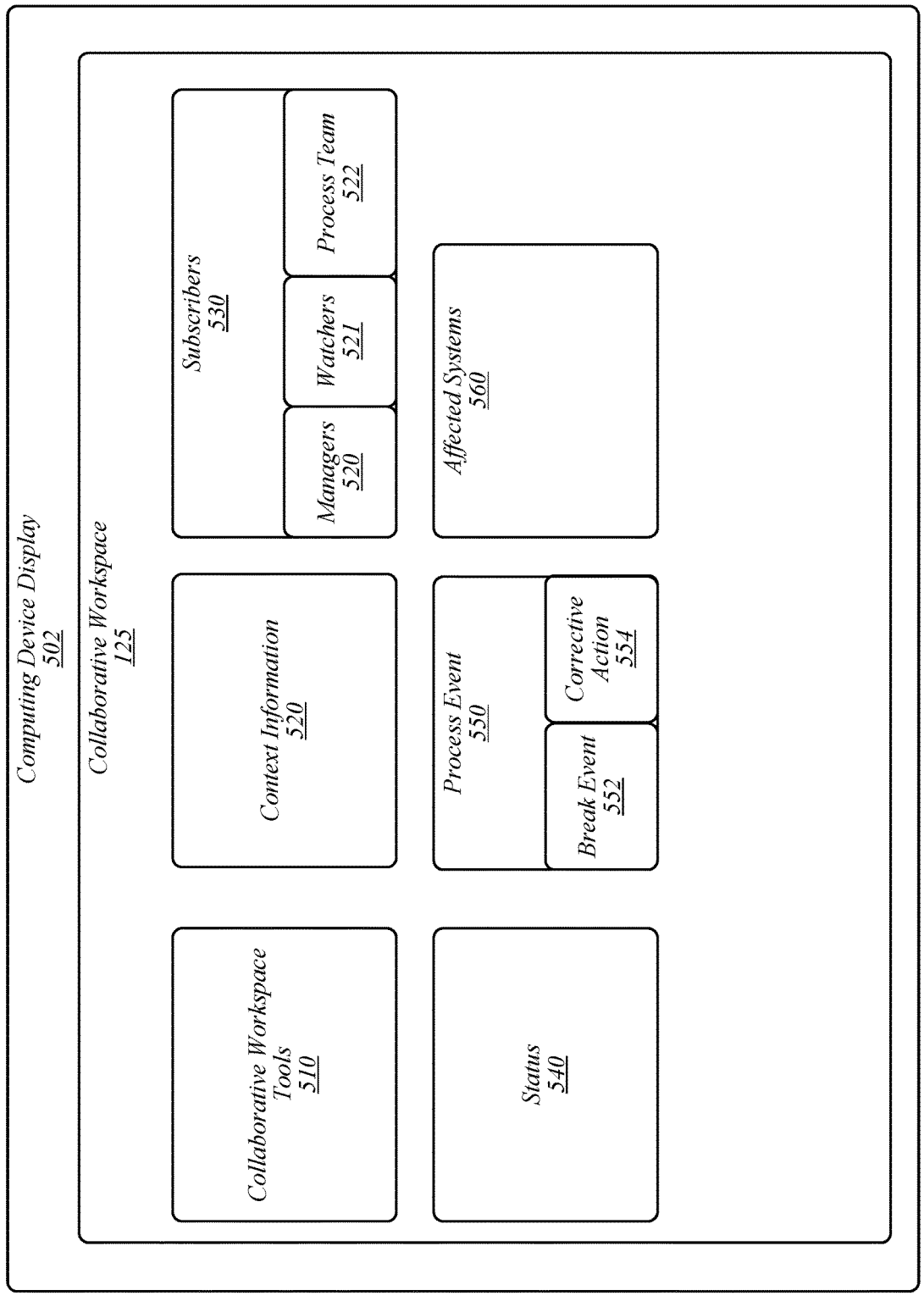

FIG. 5B illustrates an embodiment of a virtual collaborative workspace. As shown, the computing device display 502 (e.g. of a client device 180) may output a GUI for a virtual collaborative workspace 125. The virtual collaborative workspace 125 may include GUI elements for collaborative workspace tools 510, context information 520 for a process event 550, subscribers 530 to the virtual collaborative workspace 125, a status 540 of the process event 550, the process event 550, and systems 560 affected by the process event 550. To access the virtual collaborative workspace 125, the subscribers 530 may select a link to the virtual collaborative workspace 125 provided in communications transmitted by the network collaboration application 124-1 to the subscribers 530.

The collaborative workspace tools 510 GUI element may output tools exposed by the collaborative workspace 125, such as exposing runbooks 226, prior fixes for related process events, etc. The context information 520 GUI element may output a context of the applications and/or systems affected by the process event 550. The context may include a series of logged operations that led to the process event 550. The context may further include any relevant source code which may have caused the process event. The subscribers 530 GUI element may output one or more managers 521, watchers 522, and process team members 523. The status 540 GUI element may output a current status of the process event 550, a status of any associated applications, and/or a status of any associated systems and/or hardware. The process event 550 GUI element may output indications of a break event 552 (e.g., a process event associated with a failure or other operational irregularity) and/or a corrective action 554. The corrective action 554 GUI element may output a suggested corrective action to repair the process event 550, e.g., based on prior repairs that have previously corrected other process events. The affected systems 560 GUI element may output one or more applications and/or systems affected by the process event 550.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
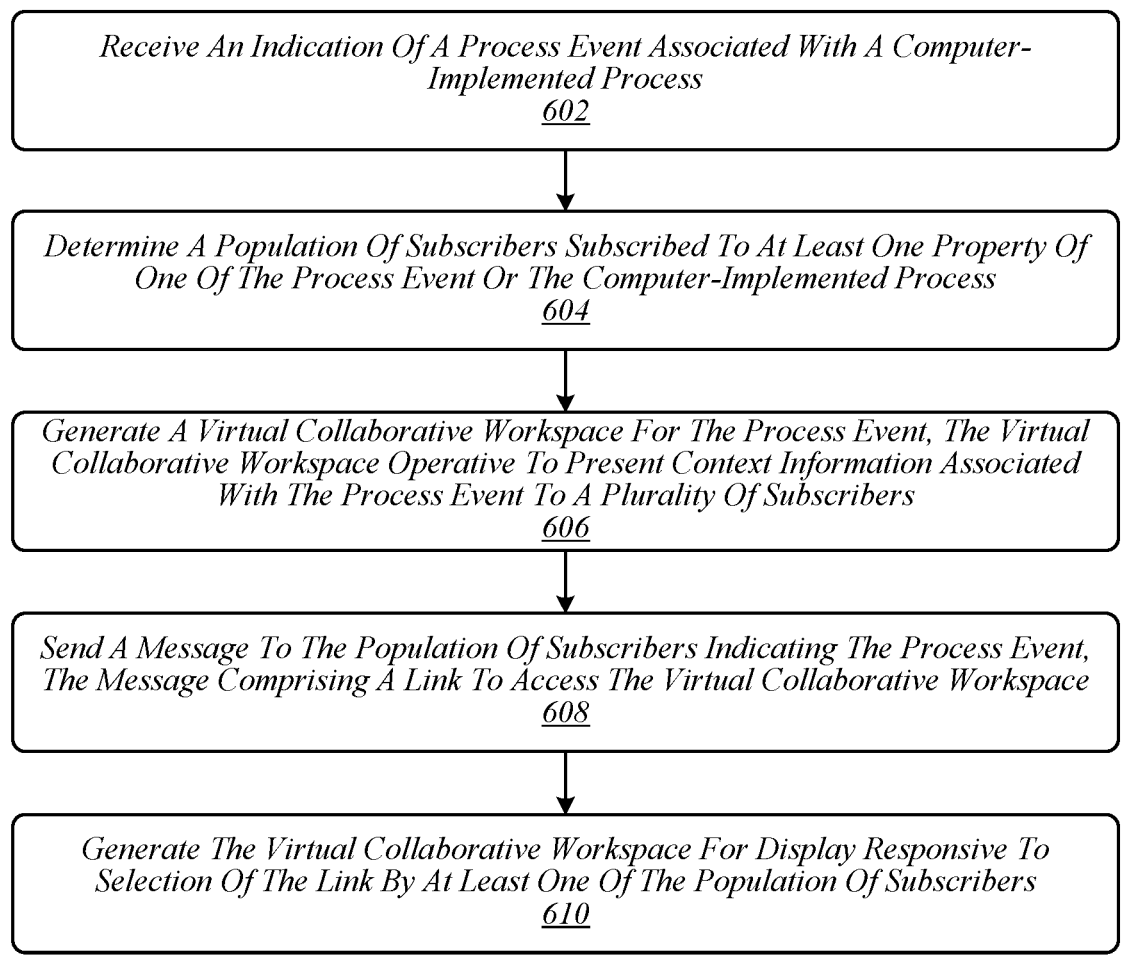
FIG. 6 illustrates an embodiment of a first logic flow.

FIG. 6 illustrates an embodiment of a logic flow 600. The logic flow 600 may be representative of some or all of the operations executed by one or more embodiments described herein. For example, the logic flow 600 may include some or all of the operations performed to provide scalable subscriptions to virtual collaborative workspaces. Embodiments are not limited in this context.

As shown, the logic flow 600 begins at block 602, where the network collaboration application 124-1 may receive an indication of a process event associated with a computer-implemented process. For example, the process event may be related to an online banking application provided by an enterprise. The network collaboration application 124-1 may further determine a severity level of the process event, a unique name for the process event, one or more lines of business impacted by the process event, and one or more processes, applications, and/or systems impacted by the process event. At block 604, the network collaboration application 124-1 may determine a population of subscribers subscribed to at least one property of the process event or the computer-implemented process. For example, based on the subscriber database 132, the network collaboration application 124-1 may determine which users are subscribed to notifications for the process (or application) impacted by the process event. As another example, the network collaboration application 124-1 may determine, based on the subscriber database 132, one or more subscribers to the process event based on one or more of the severity level, the impacted lines of business, or the processes, applications, and/or systems impacted by the process event.

At block 606, the network collaboration application 124-1 may generate a virtual collaborative workspace 125 for the process event. The virtual collaborative workspace 125 may include context information for the process event and/or status information for the impacted hardware and/or software. At block 608, the network collaboration application 124-1 generates and sends a message to each subscriber identified at block 604. The message may be sent according to one or more preferences in the subscriber database 132, e.g., email, text, social media message, etc. The message may include a link to the virtual collaborative workspace 125. At block 610, a client computing device may generate and output the virtual collaborative workspace for display responsive to selection of the link by the at least one of the population of subscribers. For example, responsive to selecting the link in the message, the GUI of FIG. 5B may be outputted on a client device 180.

FIG. 7 illustrates an embodiment of a logic flow 700. The logic flow 700 may be representative of some or all of the operations executed by one or more embodiments described herein. For example, the logic flow 700 may include some or all of the operations performed to determine a population of subscribers for virtual collaborative workspaces. Embodiments are not limited in this context.

At block 702, the network collaboration application 124-1 may generate a candidate list of subscribers from the subscriber database 132. The candidate list of subscribers may include those subscribers whose severity level settings include the severity level of the process event (e.g., the process event of block 602). For example, if the severity level of the process event is 4, the candidate list includes all subscribers having severity level settings that include the severity level of 4. At block 704, the network collaboration application 124-1 may update the candidate list to include subscribers in the subscriber database 132 subscribing to a line of business impacted by the process event. In some embodiments, the updating of the candidate list is based on an intersection of results from blocks 702 and 704. In other embodiments the updating of the candidate list is based on a union of results from blocks 704. Embodiments are not limited in this context.

At block 706, the network collaboration application 124-1 updates the candidate list based on subscribers in the subscriber database 132 subscribing to notifications for applications impacted by the process event. For example, if banking is a line of business impacted by the failure of the banking application, the users subscribing to the banking line of business may be included in the candidate list. However, as stated, in some embodiments, the updating of the candidate list is based on a union of the results from blocks 702, 704, and 706. In other embodiments, the updating of the candidate list is based on an intersection of the results from blocks 702, 704, and 706. At block 708, the network collaboration application 124-1 receives contact preferences and contact information for each subscriber in the candidate list of subscribers. The contact preferences may include preferred modes of communication, e.g., push notifications, email notifications, text messages, etc. The contact information may include push tokens, email addresses, phone numbers, etc. Doing so allows the network collaboration application 124-1 to accurately identify the relevant subscribers and transmit the preferred messages to the subscribers.

Figure 8:
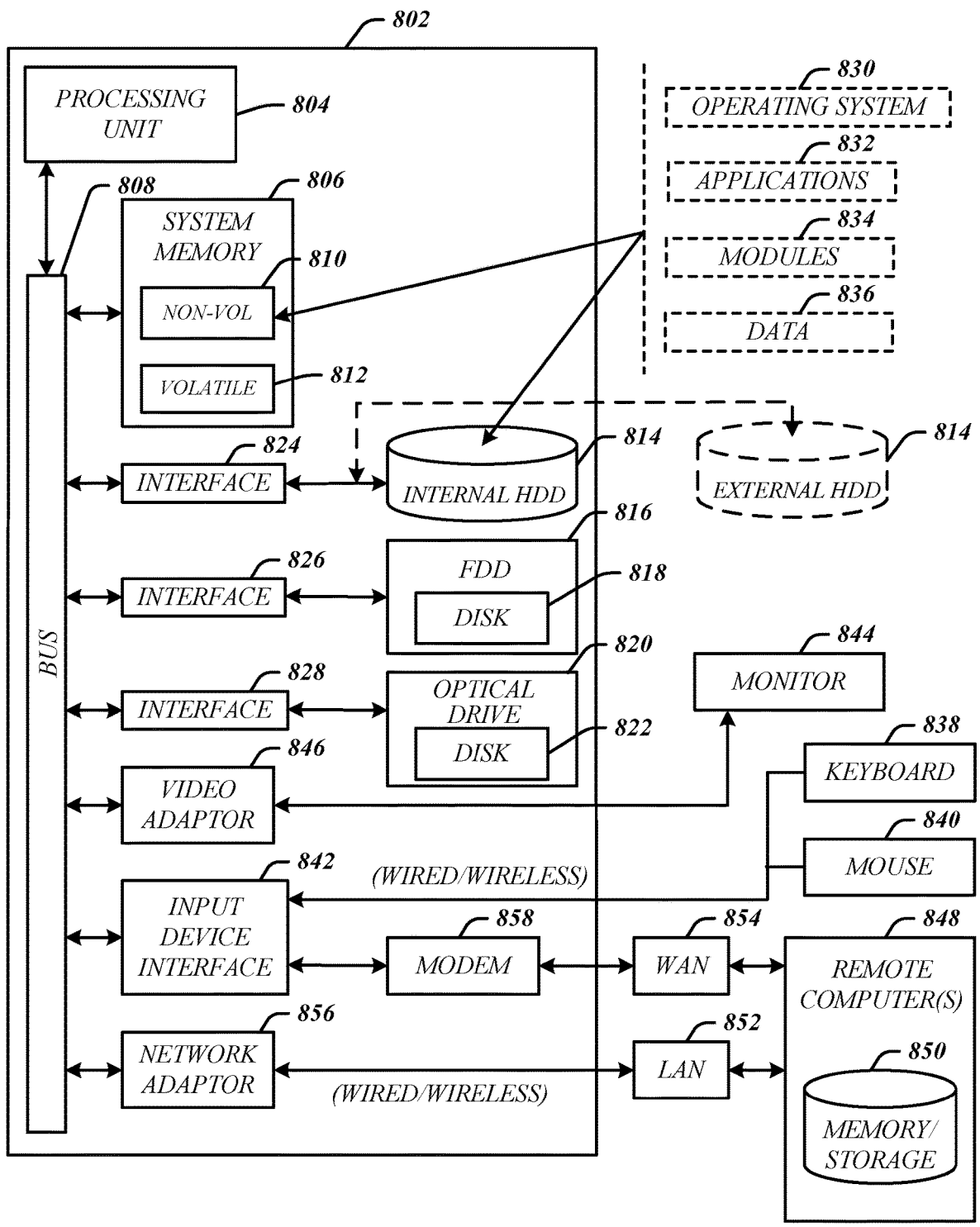
FIG. 8 illustrates an embodiment of a computing architecture.

FIG. 8 illustrates an embodiment of an exemplary computing architecture 800 comprising a computing system 802 that may be suitable for implementing various embodiments as previously described. In various embodiments, the computing architecture 800 may comprise or be implemented as part of an electronic device. In some embodiments, the computing architecture 800 may be representative, for example, of a system that implements one or more components of the systems 100, 200, 300, or 400. In some embodiments, computing system 802 may be representative, for example, of the computing device 110, computing device 180, network nodes 172, or data sources 174 of the system 100. The embodiments are not limited in this context. As another example, computing system 802 may be representative of the network systems 201-203, enterprise network systems 209, of the system 200. More generally, the computing architecture 800 is configured to implement all logic, applications, systems, methods, GUIs, apparatuses, and functionality described herein with reference to FIGS. 1-7.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 802 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 802.

As shown in FIG. 8, the computing system 802 comprises a processor 804, a system memory 806 and a system bus 808. The processor 804 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 804.

The system bus 808 provides an interface for system components including, but not limited to, the system memory 806 to the processor 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computing system 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies. The computing system 802 is generally is configured to implement all logic, systems, methods, apparatuses, and functionality described herein with reference to FIGS. 1-7.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 100, e.g., the network collaboration application 124-1, network collaboration application 124-2, virtual collaborative workspace 125, subscriber database 132, processes 134, and process event information 136. Similarly, the application programs 832, other program modules 834, and program data 836 can include, for example, the various applications and/or components of the system 200, e.g., the monitoring component 210, data storage 228, runbooks 226, runbook library 227, enterprise escalation service 230, and cloud based apps and services 208. Similarly, the application programs 832, other program modules 834, and program data 836 can include, for example, the various applications and/or components of the system 300, e.g., the user profiles 332, process event 302, collaboration workspace alert 340, context information 350, and subscriber population 352. Similarly, the application programs 832, other program modules 834, and program data 836 can include, for example, the various applications and/or components of the system 400, e.g., the communications database 440, service library 430, and application database 420.

A user can enter commands and information into the computing system 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computing system 802. In addition to the monitor 844, a computer typically includes other peripheral output devices, such as speakers, printers, and so forth.

The computing system 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computing system 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet. In embodiments, the network 170 is one or more of the LAN 852 and the WAN 854.

When used in a LAN networking environment, the computing system 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computing system 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computing system 802, or portions thereof, can be stored in the remote memory/storage device 850. It will be appreciated that the network connections shown are exemplary and other means of establishing a communications link between the computers can be used.

The computing system 802 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure.

It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. An apparatus, comprising:
   a processor; and
   a memory storing instructions which when executed by the processor cause the processor to:
   receive an indication of a process event associated with a computer-implemented process;
   determine a population of subscribers subscribed to the process event based on a respective interest level of each subscriber for the process event;
   send a message to the population of subscribers indicating the process event, the message comprising a link directed to a virtual collaborative workspace for the process event; and
   generate the virtual collaborative workspace responsive to receiving an indication specifying that the link was selected by at least one subscriber of the population of subscribers.

2. The apparatus of claim 1, the virtual collaborative workspace operative to present context information associated with the process event, the process event comprising one of a break event or a corrective action.

3. The apparatus of claim 1, wherein the population of subscribers are further subscribed to at least one of: the computer-implemented process, an event level of the process event, another computer-implemented process related to the computer-implemented process, a type of the process event, a type of the computer-implemented process, a category of the computer-implemented process, a category of the process event, a system element affected by the process event, or another computer-implemented process affected by the process event.

4. The apparatus of claim 1, the virtual collaborative workspace operative to present context information associated with the process event, the context information comprising one of historical process event information for the computer-implemented process, network components affected by the process event, historical information associated with the process event, or historical information associated with the computer-implemented process.

5. The apparatus of claim 1, the process event comprising a corrective action event, at least a portion of the population of subscribers comprising users associated with computer-implemented processes affected by the corrective action event.

6. The apparatus of claim 1, the memory storing instructions which when executed by the processor cause the processor to:
   receive an indication of a corrective action responsive to the process event;
   determine a second population of subscribers associated with the corrective action; and
   send the message to the second population of subscribers.

7. The apparatus of claim 1, the memory storing instructions which when executed by the processor cause the processor to, prior to generating the virtual collaborative workspace:
   compute a respective correlation score for each runbook of a plurality of runbooks, each runbook comprising a plurality of corrective actions;

determine that each computed correlation score does not exceed a correlation threshold; and determine that a runbook does not exist for the process event based on the correlation scores not exceeding the correlation threshold.

8. The apparatus of claim 1, the memory storing instructions which when executed by the processor cause the processor to generate a subscriber database by:

determining a plurality of properties for a plurality of network components;

receiving relationship information for a plurality of users, the relationship information indicating which of the plurality of properties are associated with each of the plurality of users; and generating the subscriber database comprising user profiles, each of the user profiles comprising a user identifier and properties associated with the user identifier.

9. A non-transitory computer-readable storage medium storing computer-readable instructions which when executed by a processor cause the processor to:

receive an indication of a process event associated with a computer-implemented process;

determine a population of subscribers subscribed to the process event based on a respective interest level of each subscriber for the process event;

send a message to the population of subscribers indicating the process event, the message comprising a link directed to a virtual collaborative workspace for the process event; and generate the virtual collaborative workspace responsive to receiving an indication specifying that the link was selected by at least one subscriber of the population of subscribers.

10. The computer-readable storage medium of claim 9, wherein the population of subscribers are further subscribed to at least one of: the computer-implemented process, an event level of the process event, another computer-implemented process related to the computer-implemented process, a type of the process event, a type of the computer-implemented process, a category of the computer-implemented process, a category of the process event, a system element affected by the process event, or another computer-implemented process affected by the process event, the instructions which when executed by the processor cause the processor to:

receive an indication of a corrective action responsive to the process event;

determine a second population of subscribers associated with the corrective action; and send the message to the second population of subscribers.

11. The computer-readable storage medium of claim 9, the virtual collaborative workspace operative to present context information associated with the process event, the context information comprising one of historical process event information for the computer-implemented process, network components affected by the process event, historical information associated with the process event, or historical information associated with the computer-implemented process, the instructions which when executed by the processor cause the processor to:

determine a second computer-implemented process affected by the process event;

determine a second population of subscribers associated with the second computer-implemented process; and send a second message to the second population of subscribers.

12. The computer-readable storage medium of claim 9, the process event comprising a break event, at least a portion of the population of subscribers comprising users authorized to fix the break event.

13. The computer-readable storage medium of claim 9, the process event comprising a corrective action event, at least a portion of the population of subscribers comprising users associated with computer-implemented processes affected by the corrective action event, the instructions which when executed by the processor cause the processor to, prior to generating the virtual collaborative workspace:

compute a risk score for the process event; and determine the risk score exceeds a threshold.

14. A method, comprising:

receiving, by a computer processor, an indication of a process event associated with a computer-implemented process;

determining, by the processor, a population of subscribers subscribed to the process event based on a respective interest level of each subscriber for the process event;

sending, by the processor, a message to the population of subscribers indicating the process event, the message comprising a link directed to access a virtual collaborative workspace for the process event; and generating, by the processor, the virtual collaborative workspace responsive to receiving an indication specifying that the link was selected by at least one subscriber of the population of subscribers.

15. The method of claim 14, wherein the population of subscribers are further subscribed to at least one of: the computer-implemented process, an event level of the process event, another computer-implemented process related to the computer-implemented process, a type of the process event, a type of the computer-implemented process, a category of the computer-implemented process, a category of the process event, a system element affected by the process event, or another computer-implemented process affected by the process event, the method further comprising:

receiving, by the processor, an indication of a corrective action responsive to the process event;

determining, by the processor, a second population of subscribers associated with the corrective action; and sending, by the processor, the message to the second population of subscribers.

16. The method of claim 14, the virtual collaborative workspace operative to present context information associated with the process event, the context information comprising one of historical process event information for the computer-implemented process, network components affected by the process event, historical information associated with the process event, or historical information associated with the computer-implemented process, the method further comprising:

determining, by the processor, a second computer-implemented process affected by the process event;

determining, by the processor, a second population of subscribers associated with the second computer-implemented process; and sending, by the processor, a second message to the second population of subscribers.

17. The method of claim 14, the process event comprising a break event, at least a portion of the population of subscribers comprising users authorized to fix the break event.

18. The method of claim 14, the process event comprising a corrective action event, at least a portion of the population of subscribers comprising users associated with computer-implemented processes affected by the corrective action event.

19. The method of claim 14, further comprising generating a subscriber database by:
- determining, by the processor, a plurality of properties for a plurality of network components;
- receiving, by the processor, relationship information for a plurality of users, the relationship information indicating which of the plurality of properties are associated with each of the plurality of users; and
- generating, by the processor, the subscriber database comprising user profiles, each of the user profiles comprising a user identifier and properties associated with the user identifier.

20. The apparatus of claim 1, wherein the population of subscribers subscribed to the process event is further determined based on a respective interest level of each subscriber for the process event.

* * * * *